United States Patent [19]
Finley

[11] 3,770,452
[45] Nov. 6, 1973

[54] BEVERAGES CONTAINING DEAMIDIZED GLUTEN
[75] Inventor: John W. Finley, Martinez, Calif.
[73] Assignee: The United States of America as represented by the Secretary of Agriculture, Washington, D.C.
[22] Filed: May 8, 1972
[21] Appl. No.: 251,166

[52] U.S. Cl............ 426/190, 99/14, 99/17, 99/105, 260/112 G
[51] Int. Cl............ A23l 1/00, A23j 1/12
[58] Field of Search............ 99/28, 14, 17, 105; 260/112 G

[56] References Cited
UNITED STATES PATENTS
2,420,735   5/1947   Coffman et al............ 260/117 G
3,030,211   4/1962   McDonald............ 99/14
2,567,980   9/1951   Tuomy et al............ 260/112 G
3,713,843   1/1973   Pour-El et al............ 99/28

FOREIGN PATENTS OR APPLICATIONS
708,806   5/1954   Great Britain............ 99/14

Primary Examiner—Morris O. Wolk
Assistant Examiner—Stephen B. Davis
Attorney—R. Hoffman et al.

[57] ABSTRACT

Native gluten is subjected to successive extractions with anhydrous isopropanol, aqueous alkali isopropanol, and aqueous acidic isopropanol to remove astringent principles. The gluten is then hydrolyzed with dilute acid to convert amide groups to carboxy groups. The non-astringent deamidized gluten is incorporated in beverages including acidic beverages such as fruit juices.

5 Claims, No Drawings

3,770,452

BEVERAGES CONTAINING DEAMIDIZED GLUTEN

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates to and has among its primary objects the provision of novel beverages containing deamidized gluten. Further objects and advantages of the invention will be evident from the following description wherein parts and percentages are by weight unless otherwise specified.

Most beverages, such as sodas, non-carbonated fruit-flavored drinks, simulated fruit juices, and the like preferred by young people, are nutritionally unbalanced. They are high in sugar but lacking in proteins. One way of aiding the battle against malnutrition would be to raise the protein content of these drinks. Gluten, a rich source of protein and readily obtainable from cereal grains, has been considered as an additive for this purpose. Unfortunately, gluten is not compatible with the acidic aqueous media that make up such beverages. If unmodified (native) gluten is added to an acidic beverage, a cloudy suspension forms. Very little, if any, of the gluten is dissolved. As a result, the appearance of the beverage is impaired and when imbibed has an undesirable effect on the palate because of its gritty texture. Also, if the beverage is allowed to settle and only the clear liquid imbibed, the consumer will obtain none of the benefit of the added protein. Another item to be considered is that native gluten develops undesirable astringency when contacted with an acidic aqueous medium such as an acidic beverage. The taste sensation is developed far back in the mouth and is described by some as a throat-burning, puckering, or bitter sensation.

The primary object of the invention is to obviate the problems outlined above. In accordance with the invention, gluten is deamidized so that it is soluble in acidic aqueous media. As a result, the modified (deamidized) gluten can be effectively employed for the nutritional fortification of beverages of all kinds, including those of an acid nature such as carbonated and non-carbonated soft drinks, simulated fruit juices, authentic fruit juices, etc. Also in accordance with the invention, the native gluten is subjected to a treatment to remove the astringent principles, whereby the modified gluten of the invention does not impair the taste of the beverage to which it is added.

DETAILED DESCRIPTION

As the starting material for the practice of the invention one may use gluten obtained from any cereal source. A preferred starting material is vital gluten which contains approximately 50 percent gliadin and 50 percent glutenin. It is prepared by making a dough of wheat flour and water and kneading the dough while washing it with water to remove the starch. The resulting wet gluten is then dried at a relatively low temperature to prevent degradation of the protein molecules. The product is referred to as "vital" because it is not denatured during its preparation.

In a first operation in accordance with the invention, vital gluten is extracted with anhydrous isopropanol to remove the astringent principles. For optimum results, a series of extractions are applied: First the gluten is extracted with anhydrous isopropanol. This initial extraction is followed by another in which 0.05 to 0.1 N food-grade alkali (e.g., NaOH or KOH) in 5–10 percent aqueous isopropanol is used as the solvent. Following this, the gluten is extracted with 0.05 to 0.1 N food-grade acid (e.g., hydrochloric or sulphuric) in 5–10 percent aqueous isopropanol to neutralize the gluten. It is, of course, obvious that the extractions may be repeated a number of times to ensure complete removal of astringent principles. Ambient temperatures or lower (e.g., 25° down to about minus 15° C.) are employed to minimize denaturation of the gluten by the applied agents. Following each extraction the solid gluten can be separated from the liquid by conventional means such as decanting, filtering, or centrifuging. Generally, in each extraction a 5–20 to 1 ratio (volume to weight) of extraction solvent to gluten is employed. It may be observed that this extraction procedure does not alter the proteinous components of the gluten since both gliadin and glutenin are insoluble in the stated solvents. Gliadin, for example, is not soluble in anhydrous isopropanol or that containing 10 percent water; it is only soluble in isopropanol containing at least 20 percent of water.

Following the removal of astringent principles, the gluten is deamidized by very dilute acid hydrolysis under controlled conditions. In this hydrolysis the primary amide groups ($-CONH_2$) occurring along the protein chains are hydrolyzed to carboxyl groups ($-COOH$) without significant rupturing of the peptide linkages which form the protein chains. Methods of preparing deamidized gluten are known in the art and form no part, per se, of the present invention. It is evident that by changing the conditions of hydrolysis, one may vary the proportion of amide groups which are converted into carboxy groups. For purposes of the invention, we use deamidized glutens wherein at least 20 percent of the amide groups are converted into carboxy groups. For maximum dispersibility in acidic beverages, it is preferred to employ the products in which about 45 to 70 percent of the amide groups are converted into carboxy groups.

Generally, 0.05 to 1.0 N HCl is used for the deamidation and is applied at a temperature from 25° to 100° C. for a period of about 20 minutes to 24 hours. As mentioned earlier, the extent of deamidation can be controlled by varying the above conditions of hydrolysis.

After the hydrolysis the deamidized gluten is dried in conventional manner, for example, spray or freeze drying. The dried material is ready for use as a beverage fortifier. Since the solid has a powdery nature, it is excellent for fortification because it allows a specific amount to be metered out for a particular liquid food or beverage. The powder is free-flowing and easy to handle and readily dissolves in either distilled water or water at pH 2–7.

It is to be particularly observed that deamidized gluten offers considerable advantages—important in the preparation of food products—as compared with unmodified gluten.

Unmodified gluten is sensitive to heat. Thus, if it is used in beverages which are subjected to heat—as for pasteurizing or sterilizing during bottling or canning—deterioration of the gluten occurs which renders it nutritionally useless. Deamidized gluten, on the other hand, is not sensitive to heat and may be used with equal success in cold and hot beverages and in those which are subjected to thermal processes such as pasteurization or sterilization.

Unmodified gluten is sensitive tp pH and is insoluble or only slightly soluble at pH 2 to 7. This means that the protein cannot be used in beverages having such a pH range. On the other hand, deamidized gluten is soluble over this entire pH range and thus can be used in such products.

The invention is of wide versatility and may be utilized for the nutritional fortification of all kinds of beverages, for example:

Carbonated beverages such as colas, ginger ale, root beer, cream soda, and the various fruit-flavored sodas such as grape, lemon and lime, orange, cherry, etc.

Non-carbonted beverages including fruit-flavored drinks such as orange, lemon, lime, grape, grapefruit, cherry, etc.

Fruit juices including orange, apple, pineapple, grapefruit, etc., and simulated juices which contain some proportion of fruit juice plus added sugar, flavorings, citric acid, etc.

Vegetable juices such as tomato juice, carrot juice, celery juice, and mixtures of tomato juice with other vegetable juices.

Beverage bases such as the dry products which contain sugar (or artificial sweetener), fruit flavor (real or imitation), citric or other fruit acid, and coloring.

Coffee and tea, both in liquid and dehydrated forms. Wines, beer, ale, and the like.

In a practice of the invention, deamidized gluten is incorporated in the beverage in a desired proportion. Thus, the amount added is not critical but merely depends on the degree of nutrient enhancement desired. Usually, we add at least 1 percent, preferably at least 3 percent. If desired, the proportion may be as high as 10 or 15 percent. Although the invention is particularly adapted for the nutritive fortification of acidic beverages it can be applied to any beverages and to other liquid foods such as whole milk, skim milk, soups, sauces, gravies, and the like.

In U.S. Pat. No. 3,030,211 there are described certain food products containing added deamidized gliadin. Although this patent (hereinafter referred to as U.S. Pat. No. 3,030,211) describes a procedure of deamidation similar to that described herein, the two inventions are quite distinct. In the first place, U.S. Pat. No. 3,030,211 is concerned with deamidized gliadin, not deamidized gluten. The procedure of U.S. Pat. No. 3,030,211 precludes its application to gluten since special techniques are used to extract gliadin therefrom. In the present invention the deamidized gluten product contains its natural complement of both gliadin and glutenin.

Secondly, the deamidized gliadin in U.S. Pat. No. 3,030,211 is employed as a stabilizer in food products such as cake frostings, dessert toppings, candies, meringues, and the like, which are subject to leakage of watery serum, graininess, and loss of volume. There is no disclosure in U.S. Pat. No. 3,030,211 of incorporating deamidized gliadin into acidic beverages, and there is no suggestion that this substance would be compatible with such beverages.

Also, a feature of the present invention is that the native gluten is subjected to a treatment to remove astringent principles. The patent in question discloses no such step. Rather, the astringent principles remain in the deamidized gliadin, but are masked by the sweetness of the products into which it is incorporated.

EXAMPLES

The invention is further demonstrated by the following illustrative examples.

EXAMPLE 1

Vital gluten (30 g.) was successively extracted with the solvents listed below, applying centrifugation after each extraction to separate the solvent from the treated gluten. The extractions were conducted at minus 15° C.

Anhydrous isopropanol (500 ml.).

Two 500-ml. portions of 0.1 N NaOH in 10 percent aqueous isopropanol.

500 ml. of 0.1 N hydrochloric acid in 10 percent aqueous isopropanol.

The so-treated gluten was then hydrolyzed (deamidized) with 1.4 liters of 0.075 N HCl in a steam-heated mixing bowl for 30 minutes. Temperature of the hydrolysis mixture was about 95° C. Following this, the mixture was lyophilized to remove the liquid components.

The resulting dry, non-astringent, deamidized gluten was found to be completely soluble in pH 3 citrate buffer. Its flavor was bland; the astringent taste of the original gluten was totally absent.

EXAMPLE 2

Dry non-astringent deamidized gluten prepared as described in Example 1 was incorporated in the proportion of 3 percent in a series of acidic beverages, namely, orange juice, lemon juice, lemonade, grapefruit juice, pineapple juice, pineapple-orange juice, and pineapple-grapefruit juice. It was observed that in each case the modified gluten went into solution, and each of the beverages exhibited the same flavor and texture as the corresponding unfortified one.

Having thus described my invention, I claim:

1. A process for preparing non-astringent deamidized gluten which retains its natural content of both gliadin and glutenin, which comprises —
    a. successively extracting vital gluten with essentially-anhydrous isopropanol, 0.05 to 0.1 N food-grade alkali in 5–10 percent aqueous isopropanol, and 0.05 to 0.1 N food-grade acid in 5–10 percent aqueous isopropanol, and
    b. hydrolyzing the so-extracted gluten with dilute acid to convert amide groups to carboxy groups without rupturing the protein chains of the gluten.

2. In the process for preparing deamidized gluten wherein native gluten is hydrolyzed with dilute acid to convert amide groups to carboxy groups, the improvement which comprises subjecting the native gluten prior to the hydrolysis to successive extraction with — a. essentially anhydrous isopropanol
    b. 0.05 to 0.1 N food-grade alkali in 5–10 percent aqueous isopropanol, and
    c. 0.05 to0.1 N food-grade acid in 5–10 percent aqueous isopropanol.

3. A beverage containing non-astringent deamidized gluten produced according to the process of claim 2 which contains its natural content of both gliadin and glutenin.

4. An acidic beverage containing in solution at least 1 percent of non-astringent deamidized gluten produced according to the process of claim 2 which contains its natural content of both gliadin and glutenin.

5. A process for enhancing the nutritive value of an acidic beverage, which comprises dissolving therein about 1–15 percent of non-astringent deamidized gluten produced according to the process of claim 2 which contains its natural content of both gliadin and glutenin.

* * * * *